United States Patent
Takano et al.

(10) Patent No.: US 8,179,605 B2
(45) Date of Patent: May 15, 2012

(54) OPTICAL ELEMENT

(75) Inventors: Toshiaki Takano, Osaka (JP); Tetsuya Suzuki, Osaka (JP); Tomokazu Tokunaga, Hyogo (JP); Toru Nanba, Osaka (JP)

(73) Assignee: Panasonic Corporation, Osaka (JP)

( * ) Notice: Subject to any disclaimer, the term of this patent is extended or adjusted under 35 U.S.C. 154(b) by 55 days.

(21) Appl. No.: 12/842,226

(22) Filed: Jul. 23, 2010

(65) Prior Publication Data
US 2011/0222172 A1   Sep. 15, 2011

(30) Foreign Application Priority Data

| Jul. 23, 2009 | (JP) | 2009-171705 |
| Jul. 23, 2009 | (JP) | 2009-171706 |
| Jul. 27, 2009 | (JP) | 2009-174053 |
| Jun. 16, 2010 | (JP) | 2010-137160 |

(51) Int. Cl.
    *G02B 3/00* (2006.01)
(52) U.S. Cl. ......................................... 359/642
(58) Field of Classification Search ............. 359/819
    See application file for complete search history.

(56) References Cited

U.S. PATENT DOCUMENTS

| 4,506,951 A | 3/1985 | Yamada |
| 5,201,763 A | 4/1993 | Brady et al. |
| 2002/0097511 A1 | 7/2002 | Kanematsu et al. |
| 2004/0207936 A1 | 10/2004 | Yamamoto et al. |
| 2005/0247081 A1 | 11/2005 | Sakata et al. |
| 2006/0284327 A1 | 12/2006 | Yamamichi |
| 2008/0285154 A1* | 11/2008 | Suzuki et al. ............ 359/716 |

FOREIGN PATENT DOCUMENTS

| JP | 62-85918 | 4/1987 |
| JP | 7-266211 | 10/1995 |
| JP | 2000-53428 | 2/2000 |
| JP | 2003-67965 | 3/2003 |
| JP | 2004-240099 | 8/2004 |
| JP | 2007-133197 | 5/2007 |

* cited by examiner

*Primary Examiner* — James Jones
(74) *Attorney, Agent, or Firm* — Hamre, Schumann, Mueller & Larson, P.C.

(57) ABSTRACT

An optical element includes: an optically functional part having a first convex surface and a second convex surface intersecting with an optical axis and facing opposite to each other; and an outer peripheral part provided around the optically functional part, the outer peripheral part having a first outer peripheral surface extending from a periphery of the first convex surface and a second outer peripheral surface extending from a periphery of the second convex surface. The first outer peripheral surface and the second outer peripheral surface each are formed to be tapered. A thickness of the outer peripheral part in an optical axis direction is reduced toward a direction moving away from the optical axis.

7 Claims, 9 Drawing Sheets

OPTICAL ELEMENT

BACKGROUND OF THE INVENTION

1. Field of the Invention

The present invention relates to an optical element used in various optical apparatuses.

2. Description of Related Art

Many optical elements, such as a lens, a prism, and a splitter, are used in image pickup systems and projection optical systems of optical apparatuses, such as a DSC (Digital Still Camera), a DVC (Digital Video Camera), a camera for a cellular phone, a projection television, a BD (Blu-ray Disk) player, a DVD (Digital Versatile Disk) player, and a CD player.

As the optical apparatuses have higher magnification, higher fineness, and higher brightness as well as smaller size and weight, the optical elements also are required to have improved accuracy, function, handlability, strength, and cost.

Typically, an optical element is made of glass or plastic. Generally, a grinding method is used when an optical element is produced from glass and an injection molding method is used when an optical element is produced from plastic (JP 62(1987)-85918 A), from the viewpoint of mass productivity and accuracy. In some cases, an optical element is formed by a precision glass molding method in which a glass lump weighed in advance is plasticized and thereafter pressed by an upper die and a lower die to be formed directly into a desired shape (JP 2000-53428 A).

JP 62(1987)-85918 A and JP 2000-53428 A disclose respectively an invention intended to enhance the releasability between a molded product (an optical element) and a molding die, and an invention intended to enhance the transfer of the shape of a molding die to a material. Specifically, a stepped engagement portion inclined with respect to an optical axis direction is provided on an outer peripheral surface of the optical element in order to allow the optical element to rotate when it is released from the molding die (JP 62(1987)-85918 A), and a gas discharging groove is formed in the molding die (JP 2000-53428 A).

Hereinafter, a method for producing an optical element by the precision glass molding method will be described.

FIGS. 9A to 9C are cross-sectional views illustrating each process of a conventional precision glass molding method. FIG. 9A is a cross-sectional view illustrating the starting phase of the molding. FIG. 9B is a cross-sectional view illustrating a phase during the molding. FIG. 9C is a cross-sectional view illustrating the completion phase of the molding.

First, as shown in FIG. 9A, an optical material to be molded 30 is set in a cavity formed by an upper die 31, a lower die 32, and a cylindrical die 33, and all of them as a whole are placed between a lower head 35 and an upper head 34. The lower head 35 and the upper head 34 have heating and pressing mechanisms.

Then, the upper die 31, the lower die 32, the cylindrical die 33, and the optical material to be molded 30 are heated using the upper head 34 and the lower head 35.

When the temperature of the optical material to be molded 30 reaches a desired temperature that allows the material 30 to be deformed, the optical material to be molded 30 is pressed by the upper head 34 as shown in FIG. 9B. The pressing deforms the optical material to be molded 30 into the shape of an optical element 11.

Thereafter, the optical element 11 is cooled while the temperature and pressure are adjusted so that an optically functional surface is transferred to the optical element 11 satisfactorily. When the temperature of the molded optical element 11 is lowered to a temperature that allows the optical element 11 to be taken out, the upper head 34 and the upper die 31 are raised to take out the optical element 11.

FIGS. 8A and 8B show the conventional optical element 11 molded by the above-mentioned method. FIG. 8A is a top view of the optical element 11 when viewed from an optical axis direction. FIG. 8B is a cross-sectional view taken along a plane including an optical axis A.

The optical element 11 includes an optically functional part 12 and an outer peripheral part 15 provided around the optically functional part 12. The optical element 11 is produced so that a thickness T of the outer peripheral part 15 uniformly is 0.5 mm.

Upon observation, the optical element 11 has cracks 18 in the outer peripheral part 15. Specifically, the cracks 18 occur in the vicinity of a boundary portion between the optically functional part 12 and the outer peripheral part 15. Even more cracks occur when the thickness T of the outer peripheral part 15 is 0.5 mm or less.

Conceivably, the cracks 18 occur because the outer peripheral part 15 is sandwiched between the upper die 31 and the lower die 32 and thereby the shrinkage of the optical element 11 in a radial direction during the molding is hindered.

Specifically, the shrinkage of the optical element 11 in the radial direction occurs when the optical element 11 is cooled in the phase shown in FIG. 9B. However, since the outer peripheral part 15 of the optical element 11 is sandwiched between the upper die 31 and the lower die 32 in the phase of FIG. 9B, the shrinkage of the optical element 11 in the radial direction is hindered. Furthermore, the outer peripheral part 15 has a poor strength because the outer peripheral part 15 itself has a small thickness. Conceivably, these are the reasons why the cracks 18 occurred in the outer peripheral part 15.

The cracks that thus occurred lower the yield in the production of the optical element. Moreover, when the cracks grow and break the optical element, the fragments of the broken optical element need to be removed, lowering the production efficiency.

Particularly, optical elements required to have a high field angle and a high magnification, such as an optical element used in a DSC, etc., are required to be thinner every year, and the thicknesses of the optical elements tend to be increasingly small. In light of this, the occurrence of cracks mentioned above affects significantly the realization of a thin optical element in the future.

SUMMARY OF THE INVENTION

The present invention has been accomplished in view of the foregoing. An object of the present invention is to prevent cracks occurring in the optical element when the optical element is being molded.

In order to solve the above-mentioned problems, the present invention provides an optical element including: an optically functional part having a first convex surface and a second convex surface intersecting with an optical axis and facing opposite to each other; and an outer peripheral part provided around the optically functional part, the outer peripheral part having a first outer peripheral surface extending from a periphery of the first convex surface and a second outer peripheral surface extending from a periphery of the second convex surface. The first outer peripheral surface and the second outer peripheral surface each are formed to be tapered. A thickness of the outer peripheral part in an optical axis direction is reduced toward a direction moving away from the optical axis.

In this optical element, the cracks occurring when the optical element is being molded can be prevented because the thickness of the outer peripheral part is reduced toward the direction moving away from the optical axis. Accordingly, it is possible to produce satisfactorily the optical element including the outer peripheral part with a small thickness, contributing to reductions in the thicknesses of optical elements and optical apparatuses.

DETAILED DESCRIPTION OF THE INVENTION

Figure 1A:
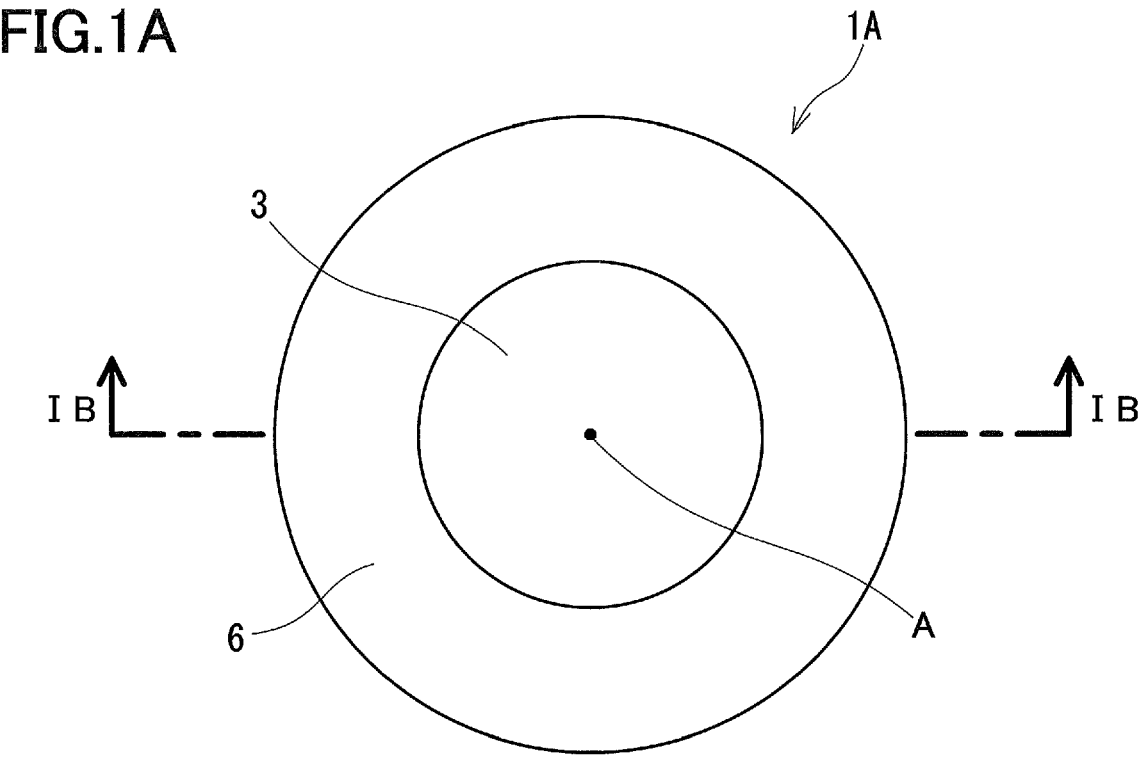
FIG. 1A is a top view of an optical element according to Embodiment 1 of the present invention.

Hereinbelow, embodiments of the present invention will be described in detail with reference to the drawings. In the embodiments, components having the same function as each other are indicated with the same reference numerals and repetitive descriptions thereof may be omitted.

(Embodiment 1)

Figure 1B:
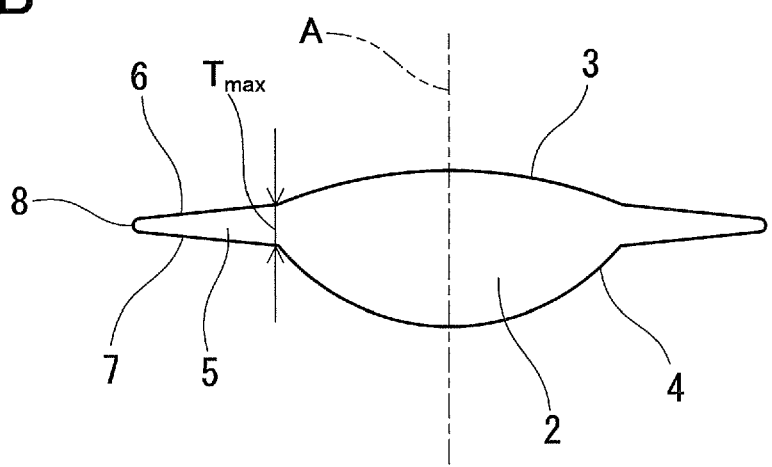
FIG. 1B is a cross-sectional view taken along the line IB-IB in FIG. 1A.

FIG. 1A is a top view of an optical element 1A according to Embodiment 1 of the present invention when viewed from an optical axis direction. FIG. 1B is a cross-sectional view taken along a plane including an optical axis A.

The optical element 1A according to the present embodiment includes an optically functional part 2 and a ring-shape outer peripheral part 5 provided around the optically functional part 2 so as to surround the optically functional part 2.

The optically functional part 2 has a first convex surface 3 and a second convex surface 4 intersecting with the optical axis A and facing opposite to each other. More specifically, the optical element 1A according to the present embodiment is a biconvex optical element. The first convex surface 3 and the second convex surface 4 are optically functional surfaces. The "optically functional surface" in this description is a surface having a function capable of satisfying the optical properties required for the optical element 1A, and is a surface to define an optical path.

The outer peripheral part 5 has a first outer peripheral surface 6 located on a side of the first convex surface 3 of the optically functional part 2, a second outer peripheral surface 7 located on a side of the second convex surface 4 of the optically functional part 2, and an outer peripheral side surface 8 joining an outer periphery of the first outer peripheral surface 6 to an outer periphery of the second outer peripheral surface 7. The outer peripheral part 5 has a thickness that is largest at a boundary portion between the optically functional part 2 and itself, and the thickness is reduced toward an outer peripheral edge of the outer peripheral part 5. The "thickness" in this description refers to a thickness in the optical axis direction in which the optical axis A extends.

A maximum thickness Tmax, which is the thickness of the thickest portion of the outer peripheral part 5, can be set to 0.5 mm or less, a thickness that causes cracks in the conventional optical element 11. For example, the maximum thickness Tmax of the outer peripheral part 5 is 0.5 mm. In this case, the first convex surface 3 has a curvature radius of 11.5 mm, the second convex surface 4 has a curvature radius of 14.5 mm, and the optically functional part 2 has a thickness of 2.13 mm on the optical axis A. However, these values are examples and determined suitably according to the optical design required.

Figure 3:
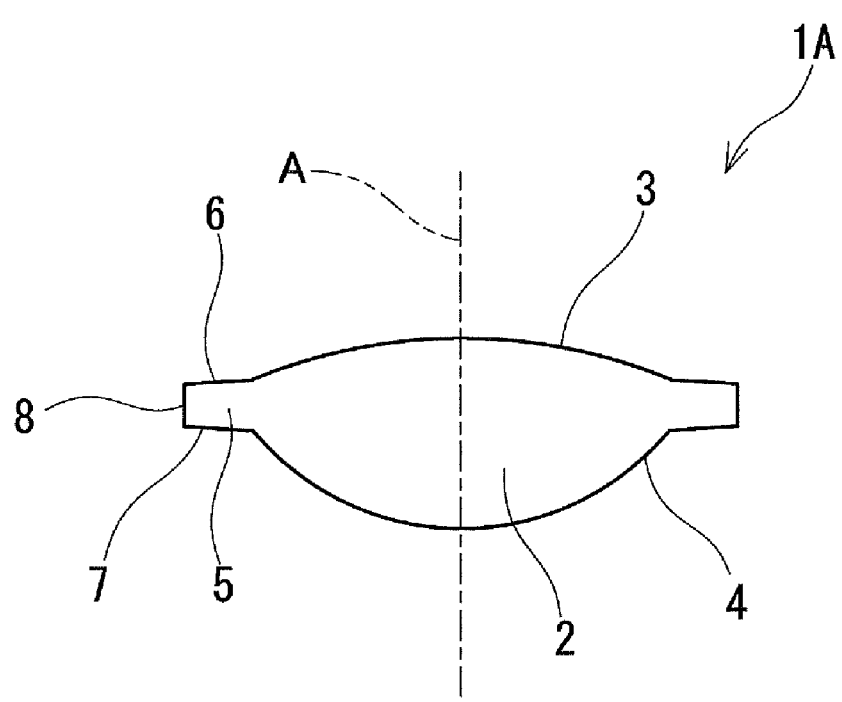
FIG. 3 is a cross-sectional view of a centering-processed optical element according to a modified example.

The outer peripheral side surface 8 is a free-form curved surface formed without contacting metal dies in the after-mentioned molding process, in other words, a free-form curved surface formed in a clearance without being restricted. As shown in FIG. 3, the outer peripheral side surface 8 of the optical element 1A may be, for example, a circular-cylindrical processed surface formed through centering processing. By composing the outer peripheral side surface 8 with the processed surface with its center being on the optical axis A, it is possible to attach the optical element 1A to an optical apparatus by using an outer periphery of the optical element 1A as a reference.

The first outer peripheral surface 6 extends from a periphery of the first convex surface 3 and forms, together with the first convex surface 3, a continuous surface facing one side of the optical axis direction. In the present embodiment, the first outer peripheral surface 6 is joined to the first convex surface 3 while forming an angle therewith. However, the first outer peripheral surface 6 may be joined smoothly to the first convex surface 3 depending on the curvature radius of the first convex surface 3. The first outer peripheral surface 6 is formed to be tapered. In other words, the first outer peripheral surface 6 is a tapered surface that is rotationally symmetric with respect to the optical axis A.

The second outer peripheral surface 7 extends from a periphery of the second convex surface 4 and forms, together with the second convex surface 4, a continuous surface facing the other side of the optical axis direction. In the present embodiment, the second outer peripheral surface 7 is joined to the second convex surface 4 while forming an angle therewith. However, the second outer peripheral surface 7 may be joined smoothly to the second convex surface 4 depending on the curvature radius of the second convex surface 4. The second outer peripheral surface 7 is formed to be tapered. In other words, the second outer peripheral surface 7 is a tapered surface that is rotationally symmetric with respect to the optical axis A.

Figure 2:
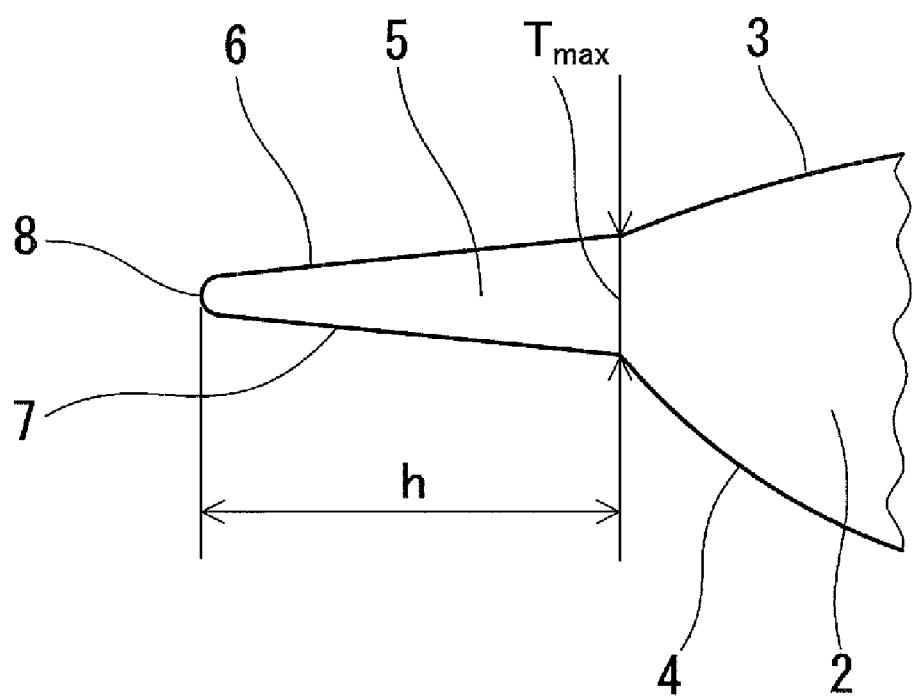
FIG. 2 is an enlarged view of an essential part of FIG. 1B.

Since the first outer peripheral surface 6 and the second outer peripheral surface 7 each are formed to be tapered, the outer peripheral part 5 has the largest thickness at the boundary portion between the optically functional part 2 and itself, and the thickness is reduced toward the outer peripheral edge of the outer peripheral part 5, that is, toward a direction moving away from the optical axis A. Where the outer peripheral side surface 8 of the outer peripheral part 5 is the free-form curved surface, it is preferable that the relationship between the maximum thickness Tmax of the outer peripheral part 5 and a width h of the outer peripheral part 5 in a radial direction from the optical axis A satisfies formula (1) below as shown in FIG. 2.

$$h/Tmax \leq 5 \qquad (1)$$

This is because if the formula (1) is satisfied, the circularity of the optical element 1A is 30 μm or less, which has been found as a result of producing the optical elements 1A by varying the maximum thickness Tmax of the outer peripheral part 5 and the width h of the outer peripheral part 5. More specifically, satisfying the formula (1) can make it unnecessary to perform the centering processing that is likely to cause the chipping and cracks in the outer peripheral part 5.

In contrast, in the case where the maximum thickness Tmax of the outer peripheral part 5 and the width h of the outer peripheral part 5 fail to satisfy the formula (1) (when h/Tmax>5), it takes time to extend, in the radially outward direction, an optical material to be molded during the production of the optical element 1A, and thus a desired shape accuracy cannot be obtained.

Preferably, the width h of the outer peripheral part 5 is 0.1 mm or more. This is because less than 0.1 mm of the width h of the outer peripheral part 5 not only makes it difficult to attach the optical element to an optical apparatus but also makes the transfer of the shape to the outer peripheral part 5 nonuniform, failing to obtain the desired shape accuracy.

Next, the method for producing the optical element 1A according to the present embodiment will be described with reference to FIGS. 4A to 4C. This production method employs a so-called precision glass molding method.

Figure 4A:
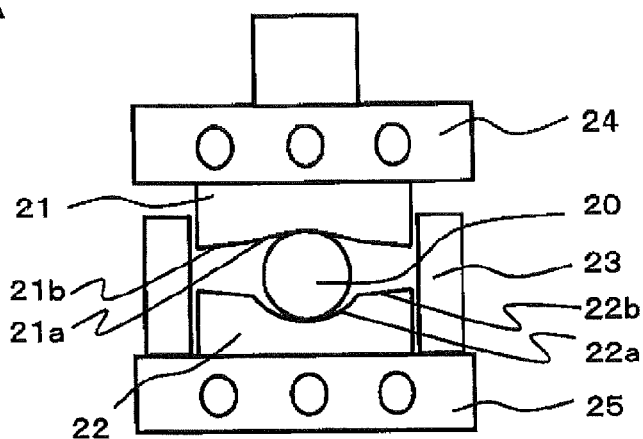
FIGS. 4A to 4C are cross-sectional views illustrating the process of molding the optical element.

FIG. 4A is a cross-sectional view illustrating the starting phase of the molding. FIG. 4B is a cross-sectional view illustrating the pressing completion phase of the molding. FIG. 4C is a cross-sectional view illustrating the phase in which an upper die 21 and an upper head 24 are raised to take out the optical element 1A.

A molding apparatus used in the present embodiment includes the upper die 21, a lower die 22, a cylindrical die 23, the upper head 24, and a lower head 25.

In the molding apparatus, the upper head 24 is provided above the upper die 21, and the lower head 25 is provided under the lower die 22 so as to support the lower die 22. The upper head 24 is provided with heating and pressing mechanisms (not shown in the drawings). Similarly, the lower head 25 is provided with a heating mechanism.

The upper die 21 includes a first concave surface 21a and a first tapered surface 21b provided around the first concave surface 21a. The first concave surface 21a is a surface that forms the first convex surface 3 by contacting an optical material to be molded 20. The first tapered surface 21b is a surface that forms the first outer peripheral surface 6 by contacting the optical material to be molded 20.

The lower die 22 includes a second concave surface 22a and a second tapered surface 22b. The second concave surface 22a is a surface that forms the second convex surface 4 by contacting the optical material to be molded 20. The second tapered surface 22b is a surface that forms the second outer peripheral surface 7 by contacting the optical material to be molded 20.

First, the optical material to be molded 20 used for producing the optical element 1A is prepared. As the optical material to be molded 20, there can be used a material obtained by forming, for example, a commercially available optical glass material into spherical shapes. Examples of the commercially available optical glass material include K-VC78 (with nd of 1.66910, Tg of 520° C., and At of 556° C.), a glass material produced by Sumita Optical Glass, Inc. The optical material to be molded 20 may be produced using a plastic material instead of the glass material.

Figure 4B:
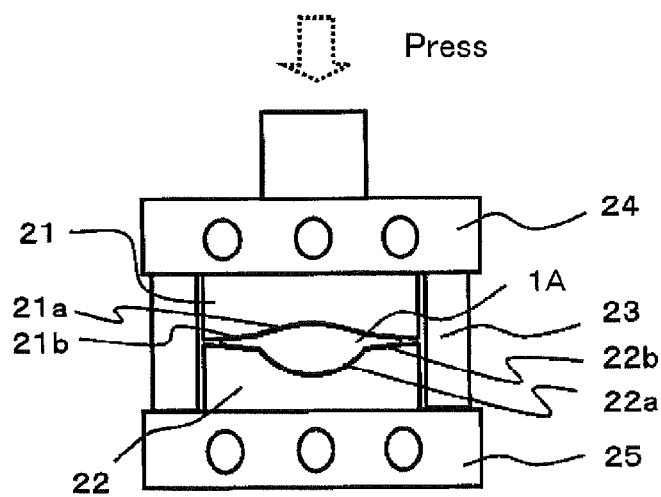
Figure 4C:
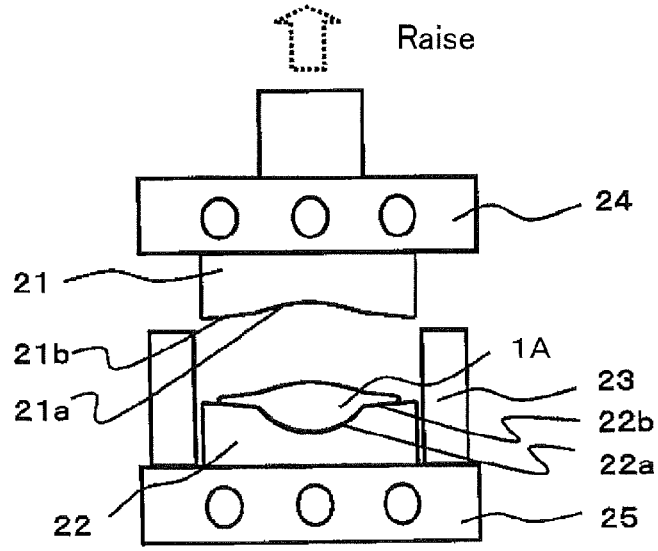

Next, as shown in FIGS. 4A to 4C, the optical material to be molded 20 is molded to produce the optical element 1A.

Subsequently, as shown in FIG. 4A, the optical material to be molded 20 is set in a cavity formed by the upper die 21, the lower die 22, and the cylindrical die 23, and all of them as a whole are placed between the lower head 25 and the upper head 24 having the heating and pressing mechanisms.

Typically, the upper die 21 and the lower die 22 each are made of a base material of cemented carbide. The cemented carbide is preferable as a material of molding dies because of its excellent strength. The upper die 21 and the lower die 22 each may include: a base material made of metal suitable for molding dies, such as stainless steel ("STAVAX" available from Uddeholm KK, for example); and a plating layer (electroless nickel plating layer, for example) covering a surface of the base material. Furthermore, a protective film may be formed on respective surfaces of the upper die 21 and the lower die 22 for improving the releasability and corrosion resistance.

The respective surfaces of the upper die 21 and the lower die 22 are processed to have a desired accuracy so that the optical element 1A molded by the upper die 21 and the lower die 22 has optical properties as designed. Thereafter, the upper die 21, the lower die 22, the cylindrical die 23, and the optical material to be molded 20 are heated to a predetermined temperature using the upper head 24 and the lower head 25. The predetermined temperature can be a temperature (570° C. to 590° C., for example) slightly higher than the glass transition temperature (Tg) or the yield temperature (At) of the glass to be used. Preferably, the heating is performed at an approximate temperature increase rate in which the optical material to be molded 20 takes several minutes (for example, 5 minutes) to reach the predetermined temperature.

When the temperature of the optical material to be molded 20 reaches the predetermined temperature that allows the material to be deformed, the upper head 24 is lowered at a desired speed and thereby pressure is applied on the upper die 22, as shown in FIG. 4B. The pressure from the upper head 24 is applied on the optical material to be molded 20 via the upper die 21, so that the optical material to be molded 20 is deformed gradually. Thus, the shapes of the respective surfaces of the upper die 21 and the lower die 22 are transferred to the optical material to be molded 20. Since the optical material to be molded 20 contacts closely the first tapered surface 21b of the upper die 21 in this transferring process, the first outer peripheral surface 6 of the optical element 1 is formed to be tapered. Also, since the optical material to be molded 20 contacts closely the second tapered surface 22b of the lower die 22, the second outer peripheral surface 7 of the optical element 1 is formed to be tapered. Moreover, the optical material to be molded 20 is set to have a volume that does not allow the material 20 to contact the cylindrical die 23, so that the outer peripheral side surface 8 of the optical element 1 becomes a free-form curved surface.

When the optical material to be molded 20 is deformed into the shape of the optical element 1A, the upper head 24 stops applying the pressure. Then, this state is maintained at the above-mentioned predetermined temperature for about 1 minute. Thereafter, the heating mechanisms in the upper head 24 and the lower head 25 are turned off, and the optical element 1A is cooled to the glass transition temperature (520° C.) while the upper head 24 is kept lowered. In order to avoid the occurrence of defects in the optical element 1A such as distortion, it is preferable that the optical element 1A is cooled slowly over several minutes (about 5 minutes, for example).

In this cooling process, the optical element 1A shrinks in the radial direction. However, since the first outer peripheral surface 6 and the second outer peripheral surface 7 each are formed to be tapered in the present embodiment, the shrinkage of the optical element 1A in the radial direction is less likely to be hindered than in conventional molding processes. Accordingly, problems, such as cracks and breakage, are less likely to occur in the optical element 1A. As a result, the production yield is increased. Furthermore, since the shrinkage of the optical element 1A in the radial direction is less likely to be hindered, the shrinkage of the optical element 1A is stabilized, making it possible to obtain the optical element 1A having a satisfactory shape accuracy.

Thereafter, when the temperature of the molded optical element 1A is lowered to a temperature that allows the optical element 1A to be taken out, the upper head 24 and the upper die 21 are raised to take out the optical element 1A.

In the case of a conventional optical element whose outer peripheral part has a uniform thickness, cracks and breakage occur when the thickness is 0.5 mm or less. However, the optical element 1A according to the present embodiment has no cracks, breakage, or the like when it is actually produced.

Since the first outer peripheral surface 6 and the second outer peripheral surface 7 each are formed to be tapered as described above, the optical element can achieve a satisfactory shape accuracy even when its outer peripheral part has a small thickness. Moreover, using such an optical element for an optical apparatus makes it possible to reduce the thickness of the optical apparatus.

(Embodiment 2)

Figure 5A:
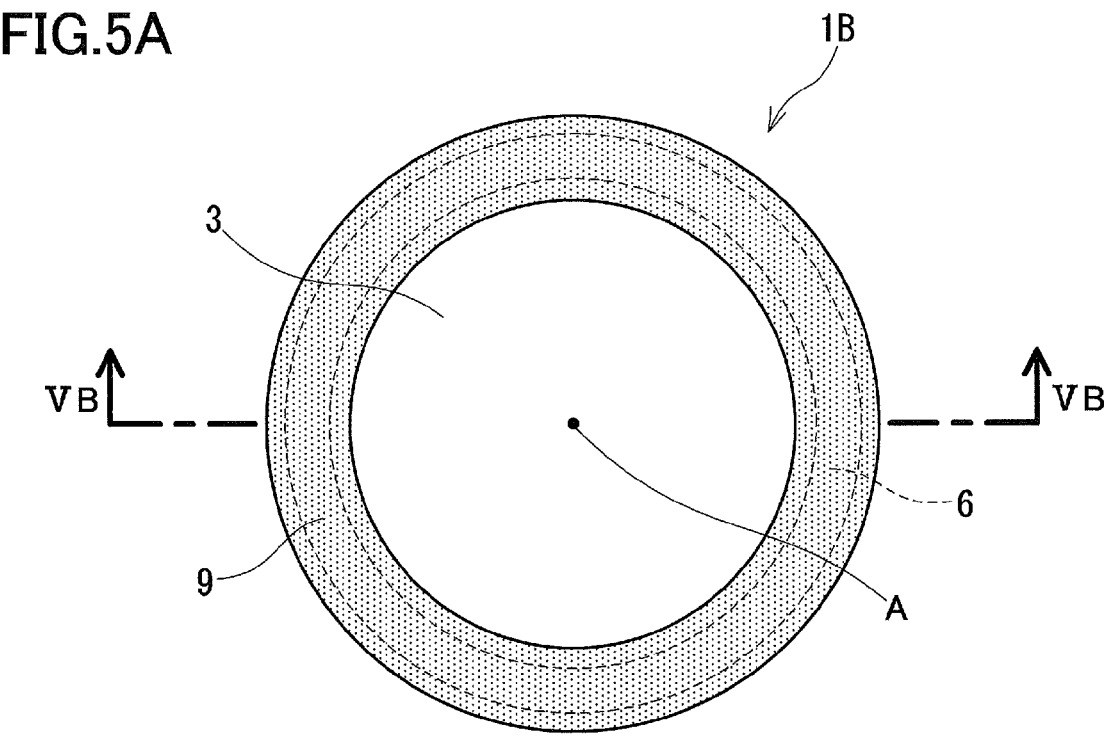
FIG. 5A is a top view of an optical element according to Embodiment 2 of the present invention.
Figure 5B:
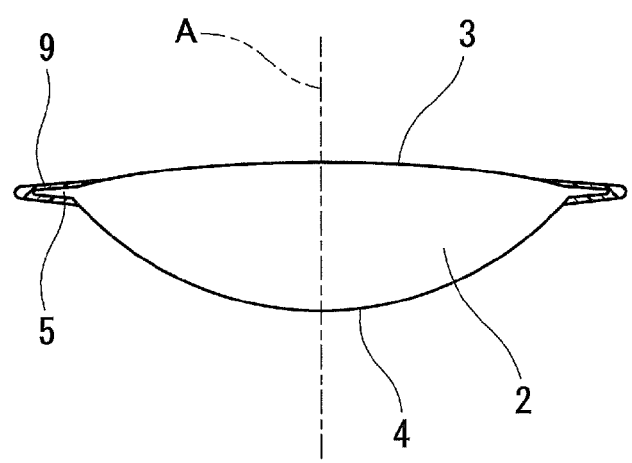
FIG. 5B is a cross-sectional view taken along the line VB-VB in FIG. 5A.
Figure 6:
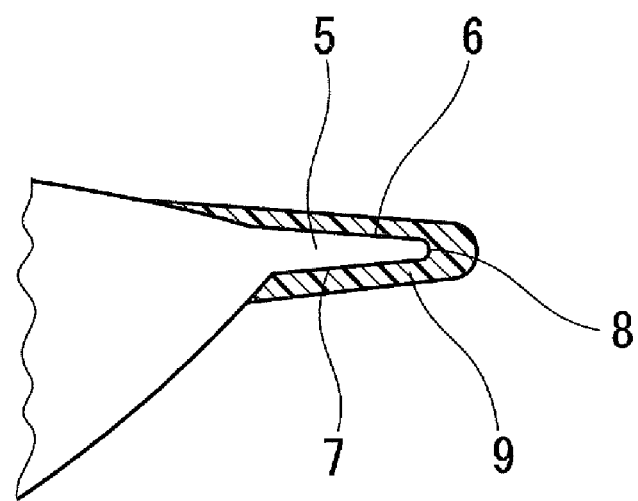
FIG. 6 is an enlarged view of an essential part of FIG. 5B.

FIG. 5A is a top view of an optical element 1B according to Embodiment 2 of the present invention when viewed from the optical axis direction. FIG. 5B is a cross-sectional view taken along a plane including the optical axis A. FIG. 6 is an enlarged view of an essential part of FIG. 5B. Components having the same function as in Embodiment 1 are indicated with the same reference numerals and repetitive descriptions thereof are omitted.

The optical element 1B according to the present embodiment has a reinforcement part 9 for reinforcing the boundary portion between the optically functional part 2 and the outer peripheral part 5. In the present embodiment, the reinforcement part 9 is configured to reinforce a peripheral portion of the optically functional part 2 and the entire outer peripheral part 5. Specifically, the reinforcement part 9 is formed so as to cover a region outside an optically effective diameter of the first convex surface 3, the first outer peripheral surface 6, the outer peripheral side surface 8, the second outer peripheral surface 7, and a region outside an optically effective diameter of the second convex surface 4.

The optical element 1B can be obtained by forming the reinforcement part 9 on a molded product produced as in Embodiment 1. Hereinafter, a description will be made with respect to the process of applying, with a sputtering apparatus, silicon carbide to form a silicon carbide thin film as an example of the reinforcement part 9.

First, on both surfaces of a molded product obtained by the same method as in Embodiment 1, a region corresponding to the optically effective diameter is masked, and the molded product is set in the sputtering apparatus. Then, a sputtering treatment is performed for about 30 minutes under the conditions that the initial vacuum degree in the sputtering apparatus is set to $1.0 \times 10^{-4}$ Pa or more, the pressure of argon gas during the film formation is set to $1.0 \times 10^{-2}$ Pa to $1.0 \times 10^{-1}$ Pa, the temperature of a silicon carbide substrate is set to 500° C., and the temperature of the molded product is set to 150° C., for example. Thereby, a silicon carbide thin film with a thickness of about 0.4 μm can be formed.

It is easy to handle the optical element 1B with the reinforcement part 9 obtained as mentioned above because the outer peripheral part 9 is less likely to be broken when, for example, the optical element 1B is attached to an optical apparatus even with the outer peripheral part 9 having a small thickness.

Figure 7A:
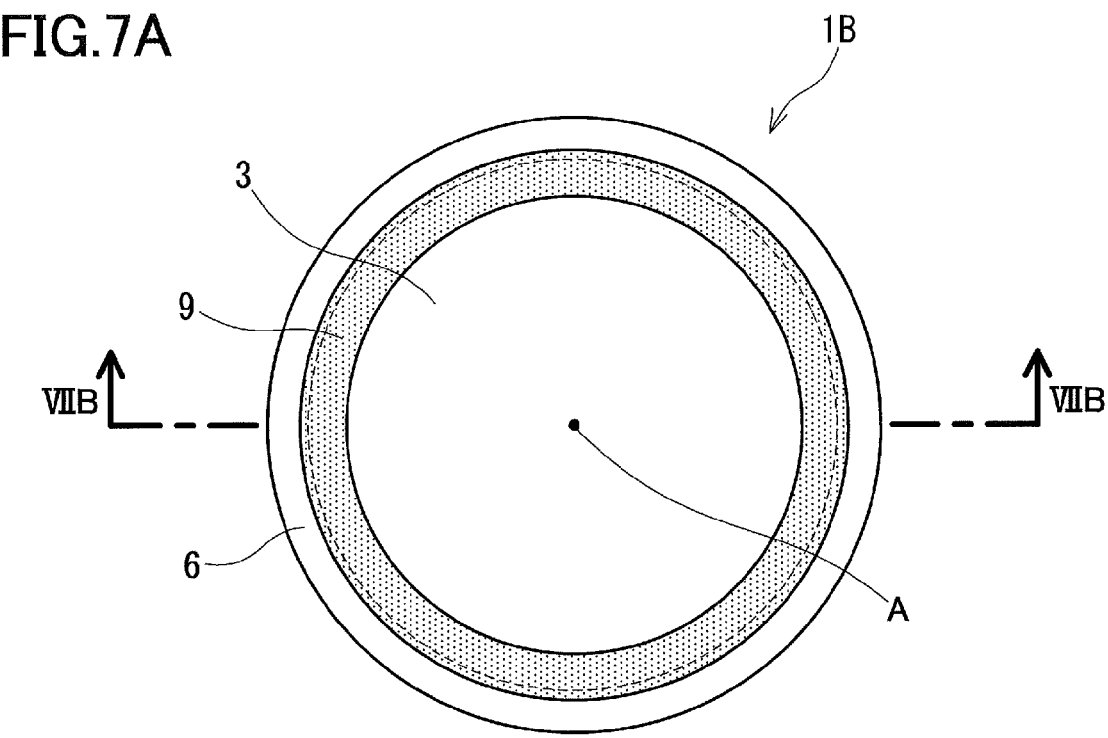
FIG. 7A is a top view of an optical element according to a modified example in which an edge of an outer peripheral part is exposed.
Figure 7B:
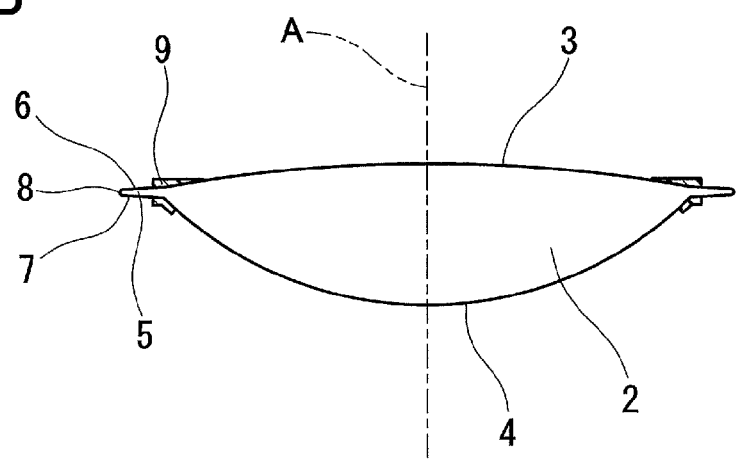
FIG. 7B is a cross-sectional view taken along the line VIIB-VIIB in FIG. 7A.
Figure 8A:
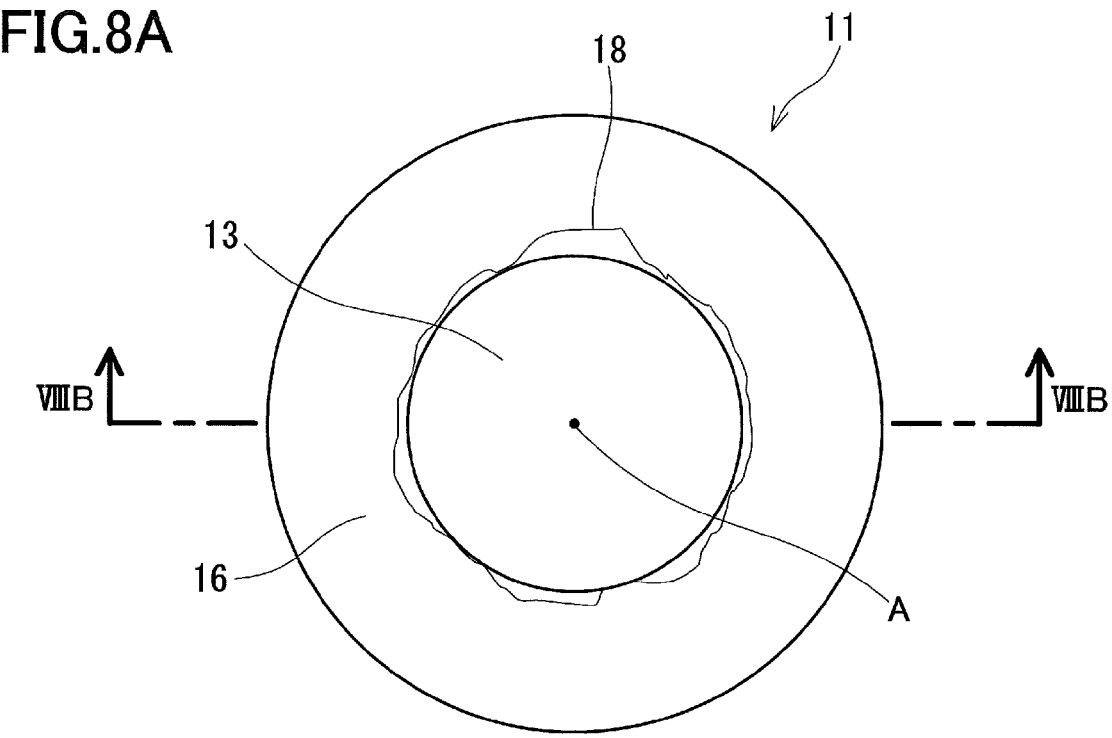
FIG. 8A is a top view of a conventional optical element.
Figure 8B:
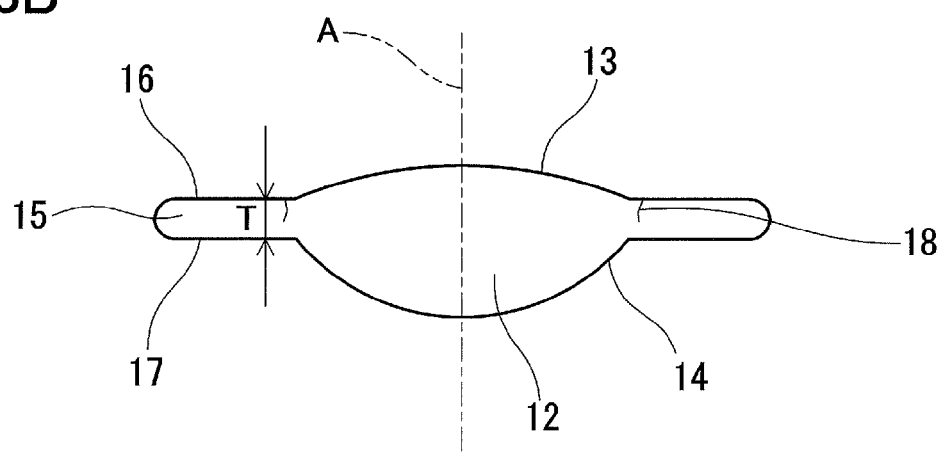
FIG. 8B is a cross-sectional view taken along the line VIIIB-VIIIB in FIG. 8A.
Figure 9A:
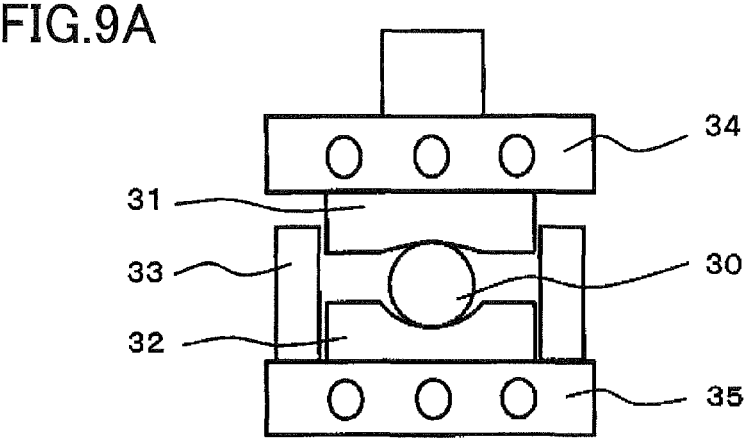
FIGS. 9A to 9C are cross-sectional views illustrating the process of molding the conventional optical element.
Figure 9B:
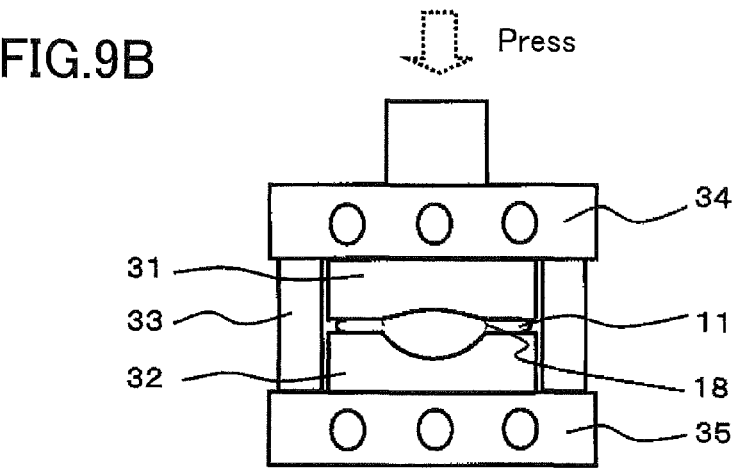
Figure 9C:
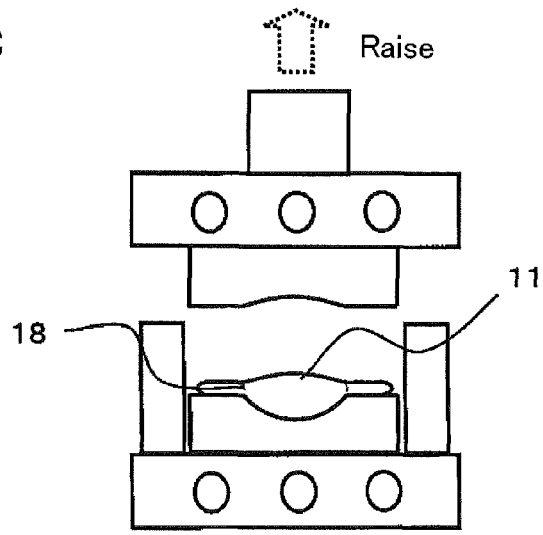

Although the entire outer peripheral part 9 is reinforced in the present embodiment, at least a portion of the outer peripheral part 9 adjacent to the optically functional part 2 has only to be reinforced. For example, as shown in FIGS. 7A and 7B, the reinforcement part 9 may not be formed at an edge of the outer peripheral part 5. The reinforcement part 9 in this case is made of ultraviolet curable resin, for example.

Specifically, the reinforcement part 9 is formed in such a manner that a part of the first outer peripheral surface 6, a part of the second outer peripheral surface 7, and the outer peripheral side surface 18 are exposed. Since shrinkage occurs in the ultraviolet curable resin when it is cured by irradiation of ultraviolet rays, the thickness of the reinforcement part 9 varies occasionally. Thus, when, for example, the optical element is mounted to a lens holder or the like, the optical element is tilted in some cases. However, in the present embodiment, it is possible to mount the optical element 1B to the lens holder or the like without being affected by the variation in the thickness of the reinforcement part 9 because the reinforcement part 9 is not formed at the edge of the outer peripheral part 5.

In the optical element 1B, the method for reinforcing the peripheral portion of the optically functional part 2 and the at least a portion of the outer peripheral part 5 adjacent to the optically functional part 2 may be a method in which the glass itself that is the material of the optical element is strengthened. More specifically, the peripheral portion of the optically functional part 2 and the at least a portion of the outer peripheral part 5 adjacent to the optically functional part 2 may be strengthening-treated.

For example, it is possible to use a chemical strengthening method in which the optical element whose central portion is masked is immersed in a strengthening treatment liquid such as molten salt, and metal ions in the region outside the optically effective diameter on each of the surfaces of the optically functional part 2 and metal ions in a surface of the outer peripheral part 5 are exchanged with metal ions in the strengthening treatment liquid. Alternatively, it is possible to use an ion implantation method in which desired ions (phosphorous ions, for example) are implanted into the peripheral portion of the optically functional part 2 and the outer peripheral part 5 so that silicon in the glass component is partly substituted with phosphorus.

The optical element according to the present invention suitably can be used in optical apparatuses required to reduce in size and weight, such as a DSC, a DVC, a camera for a cellular phone, a projection television, and an optical pickup device.

The present invention is applicable to various other embodiments unless they depart from the intentions and the essential features of the invention. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

What is claimed is:

1. An optical element, comprising:
   an optically functional part having a first convex surface and a second convex surface intersecting with an optical axis and facing opposite to each other; and
   an outer peripheral part provided around the optically functional part, the outer peripheral part having a first outer peripheral surface extending from a periphery of the first convex surface and a second outer peripheral surface extending from a periphery of the second convex surface, wherein the first outer peripheral surface and the second outer peripheral surface each are formed to be tapered so as to incline from the peripheries of the first and second convex surfaces so that a thickness of the outer peripheral part in an optical axis direction is continuously reduced toward a direction moving away from the optical axis, and a maximum thickness of the outer peripheral part is 0.5 mm or less.

2. An optical element, comprising:

an optically functional part having a first convex surface and a second convex surface intersecting with an optical axis and facing opposite to each other; and an outer peripheral part provided around the optically functional part, the outer peripheral part having a first outer peripheral surface extending from a periphery of the first convex surface and a second outer peripheral surface extending from a periphery of the second convex surface, wherein the first outer peripheral surface and the second outer peripheral surface each are formed to be tapered, and a thickness of the outer peripheral part in an optical axis direction is reduced toward a direction moving away from the optical axis;

the outer peripheral part has an outer peripheral side surface joining an outer periphery of the first outer peripheral surface to an outer periphery of the second outer peripheral surface, and the outer peripheral side surface is a free-form curved surface formed in a clearance without being restricted; and when a maximum thickness of the outer peripheral part in the optical axis direction is denoted as Tmax and a width of the outer peripheral part in a radial direction from the optical axis is denoted as h, the optical element satisfies h/Tmax <5.

3. The optical element according to claim 1, wherein a width of the outer peripheral part in a radial direction from the optical axis is 0.1 mm or more.

4. An optical element, comprising:

an optically functional part having a first convex surface and a second convex surface intersecting with an optical axis and facing opposite to each other;

an outer peripheral part provided around the optically functional part, the outer peripheral part having a first outer peripheral surface extending from a periphery of the first convex surface and a second outer peripheral surface extending from a periphery of the second convex surface, wherein the first outer peripheral surface and the second outer peripheral surface each are formed to be tapered, and a thickness of the outer peripheral part in an optical axis direction is reduced toward a direction moving away from the optical axis; and a reinforcement part for reinforcing a peripheral portion of the optically functional part and at least a portion of the outer peripheral part adjacent to the optically functional part.

5. The optical element according to claim 1, wherein a peripheral portion of the optically functional part and at least a portion of the outer peripheral part adjacent to the optically functional part are reinforced.

6. The optical element according to claim 5, wherein the peripheral portion of the optically functional part and the at least a portion of the outer peripheral part adjacent to the optically functional part are strengthened by an ion implantation method.

7. The optical element according to claim 5, wherein the peripheral portion of the optically functional part and the at least a portion of the outer peripheral part adjacent to the optically functional part are strengthened by a chemical strengthening method.

* * * * *

UNITED STATES PATENT AND TRADEMARK OFFICE
CERTIFICATE OF CORRECTION

PATENT NO. : 8,179,605 B2
APPLICATION NO. : 12/842226
DATED : May 15, 2012
INVENTOR(S) : Takano et al.

It is certified that error appears in the above-identified patent and that said Letters Patent is hereby corrected as shown below:

Column 9, line 38 (Claim 2): "$h/T_{max} < 5$" should read -- $h/T_{max} \leq 5$ --.

Signed and Sealed this
Thirteenth Day of November, 2012

David J. Kappos
*Director of the United States Patent and Trademark Office*